United States Patent
Bellows et al.

(10) Patent No.: US 12,232,075 B2
(45) Date of Patent: Feb. 18, 2025

(54) SYSTEM AND METHOD FOR AUTOMATED AND DYNAMIC LOCATION TRACKING

(71) Applicant: ZEBRA TECHNOLOGIES CORPORATION, Lincolnshire, IL (US)

(72) Inventors: David Bellows, Old Westbury, NY (US); Matthew Louis Kowalski, Merrick, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 376 days.

(21) Appl. No.: 17/876,289

(22) Filed: Jul. 28, 2022

(65) Prior Publication Data

US 2024/0040539 A1    Feb. 1, 2024

(51) Int. Cl.
H04W 24/00 (2009.01)
H04W 4/33 (2018.01)
H04W 4/35 (2018.01)
H04W 64/00 (2009.01)

(52) U.S. Cl.
CPC ........... *H04W 64/003* (2013.01); *H04W 4/33* (2018.02); *H04W 4/35* (2018.02)

(58) Field of Classification Search
CPC ........ H04W 64/003; H04W 4/33; H04W 4/35
USPC ..................................................... 455/456.1
See application file for complete search history.

(56) References Cited

U.S. PATENT DOCUMENTS

| | | | |
|---|---|---|---|
| 2006/0055530 A1 | 3/2006 | Wang et al. | |
| 2014/0361077 A1 | 12/2014 | Davidson | |
| 2016/0274586 A1 | 9/2016 | Stubbs et al. | |
| 2018/0029797 A1 | 2/2018 | Hance et al. | |
| 2018/0218185 A1 | 8/2018 | High et al. | |
| 2022/0256310 A1* | 8/2022 | Volkerink | H04W 4/024 |

OTHER PUBLICATIONS

International Search Report and Written Opinion for International Application No. PCT/US2023/27735 mailed on Oct. 6, 2023.

* cited by examiner

*Primary Examiner* — Temica M Beamer

(57) ABSTRACT

Systems and methods for automated and dynamic location tracking are provided. The system receives first location sensor data from a first location sensor indicative of first location information of at least one item associated with a radio frequency identification tag and detects a location change of the at least one item based on the received first location sensor data. The system determines whether the location change of the at least one item is greater than a predetermined threshold and generates and transmits a navigation path to a second location sensor indicative of an area associated with the first location information when the location change of the at least one item is greater than a predetermined threshold. The system receives second location sensor data from the second location sensor along the navigation path indicative of second location information of the at least one item within the area associated with the first location information.

20 Claims, 9 Drawing Sheets

SYSTEM AND METHOD FOR AUTOMATED AND DYNAMIC LOCATION TRACKING

BACKGROUND

A facility (e.g., a warehouse and/or distribution center), storing items for shipment can utilize an inventory location tracking system. An inventory location tracking system can track and locate items in a facility via a radio frequency identification (RFID) tag affixed to each item and one or more location sensors (e.g., an RFID reader). For example, a facility can include one or more RFID readers installed throughout the facility, and data captured by these RFID readers (e.g., tag responses to interrogation signals transmitted by the RFID readers) can be utilized to determine the locations of RFID-tagged items in the facility.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
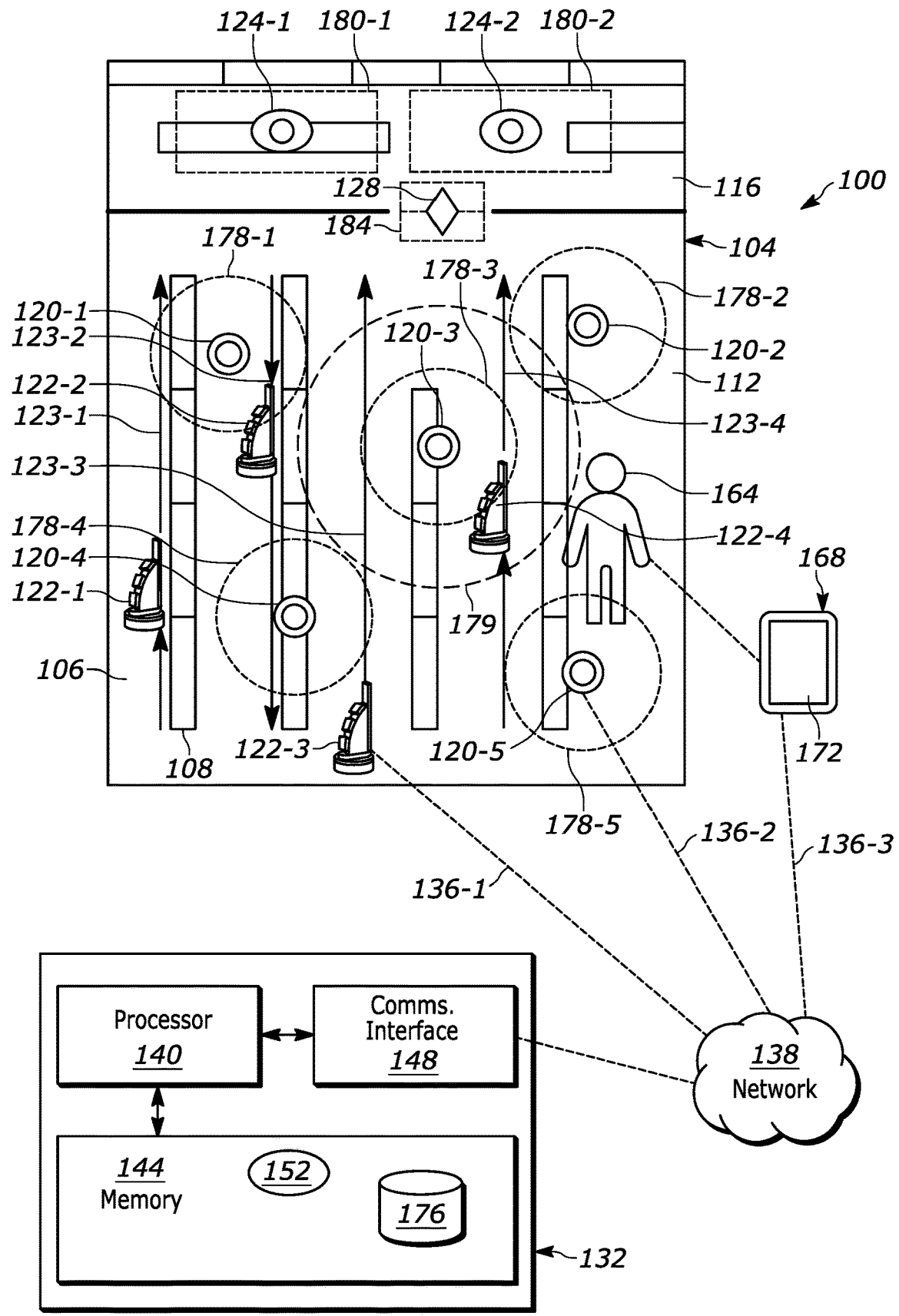
FIG. 1 is a diagram illustrating an embodiment of the system of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to an automated and dynamic location tracking system comprising a memory configured to store computer executable instructions and a processor configured to interface with the memory and execute the computer executable instructions to cause the processor to receive first location sensor data from a first location sensor indicative of first location information of at least one item associated with a radio frequency identification (RFID) tag, detect a location change of the at least one item based on the received first location sensor data, determine whether the location change of the at least one item is greater than a predetermined threshold, generate and transmit a navigation path to a second location sensor indicative of an area associated with the first location information when the location change of the at least one item is greater than a predetermined threshold, and receive second location sensor data from the second location sensor along the navigation path indicative of second location information of the at least one item within the area associated with the first location information.

Additional examples disclosed herein are directed to a method for automated and dynamic location tracking comprising receiving first location sensor data from a first location sensor indicative of first location information of at least one item associated with a radio frequency identification (RFID) tag, detecting a location change of the at least one item based on the received first location sensor data, determining whether the location change of the at least one item is greater than a predetermined threshold, generating and transmitting a navigation path to a second location sensor indicative of an area associated with the first location information when the location change of the at least one item is greater than a predetermined threshold, and receiving second location sensor data from the second location sensor along the navigation path indicative of second location information of the at least one item within the area associated with the first location information.

Additional examples disclosed herein are directed to a non-transitory computer readable medium having instructions stored thereon for automatic and dynamic location tracking which, when executed by a processor, causes the processor to carry out the steps of receiving first location sensor data from a first location sensor indicative of first location information of at least one item associated with a radio frequency identification (RFID) tag, detecting a location change of the at least one item based on the received first location sensor data, determining whether the location change of the at least one item is greater than a predetermined threshold, generating and transmitting a navigation path to a second location sensor indicative of an area associated with the first location information when the location change of the at least one item is greater than a predetermined threshold, and receiving second location sensor data from the second location sensor along the navigation path indicative of second location information of the at least one item within the area associated with the first location information.

Lost or misplaced inventory can result in significant business losses and/or disruptions via expedited orders, re-orders and time-consuming searches for inventory. Additionally, manually performing inventory is time-consuming and prone to error, often performed infrequently such that the inventory has minimal value in real time, and can tax a depleted and overwhelmed workforce.

An inventory tracking system can track the locations of items as the items move in a facility via an RFID tag affixed to each item and one or more RFID readers. For example, an inventory tracking system can utilize one or more RFID readers to detect and read RFID tags affixed to items to track location changes of the items as the items enter or leave a facility, move between shelving racks, move through high trafficked aisles, and/or move into or out of storage aisles.

Tracking a location of a static item positioned on a shelving rack amongst hundreds of other static items on the shelving rack can be challenging because an inventory tracking system can have a limited capability to specifically locate where an item is positioned on the shelving rack. For example, an RFID reader may only receive location information limited to an aisle where an item was last located before being positioned on a shelving rack.

Additionally, an RFID reader can be installed in an overhead position on a ceiling of a facility such that the antenna thereof has a fixed position and therefore has limited radio frequency (RF) diversity (e.g., a line of sight) to locate an item positioned on a shelving rack. As such, an overhead inventory tracking system capable of locating an item positioned on a shelving rack can require an inordinate amount of RFID readers or antennas installed on a ceiling of a facility which is logistically challenging, time-consuming, and cost prohibitive.

An RFID autonomous mobile robot (AMR) can locate a static item positioned on a shelving rack via one or more antennas that can detect and read an RFID tag affixed to the item. For example, an AMR can move up and down aisles of a facility via one or more predetermined paths and utilize one or more antennas to detect and read RFID tags. As such, an AMR can provide greater RF diversity because the AMR is mobile. For example, as an AMR moves up and down aisles of a facility, the AMR can continuously change position to yield an optimal location and orientation to detect and read RFID tags affixed to items positioned on shelving racks adjacent to the AMR.

A predetermined path of an AMR may be inefficient without targeted and meaningful workflow and/or navigation path instructions. For example, an AMR can spend an insufficient amount of time in areas (e.g., zones) of a facility that are highly trafficked (e.g., subject to significant inventory changes) or can spend too much time in zones of a facility that are lightly trafficked or static (e.g., infrequently subject to inventory changes). Additionally, since an AMR collects real-time data (e.g., item location information) that is local to the AMR, it is important that an AMR efficiently utilizes its time by scanning facility zones subject to significant inventory changes. As such, it would be advantageous to automatically generate and/or dynamically modify a navigation path of an AMR to collect useful item location information.

Accordingly, it would be highly beneficial to develop a system and method that can detect item location changes within a facility and, in response to the detected item location changes, automatically generate and/or dynamically modify a navigation path of at least one AMR to locate a static item positioned on a shelving rack of the facility by utilizing the at least one AMR to scan facility zones associated with the detected item location changes along the automatically generated and/or dynamically modified navigation path. The systems and methods of the present disclosure address these and other needs.

Turning to the drawings, FIG. 1 is a diagram illustrating an embodiment of the system 100 of the present disclosure. FIG. 1 illustrates a location tracking system 100 deployed in a facility 104 (e.g., a warehouse or distribution facility depicted from overhead) containing items disposed on shelving. As shown in FIG. 1, the facility 104 includes a plurality of aisles 106 and a plurality of rows 108 (e.g., of shelving racks) in a floor area 112. The rows 108 support a variety of items for shipment from the facility 104. It should be understood that the facility 104 can be a retail facility containing items disposed on racks, shelving, or the like where the rows 108 in the floor area 112 (e.g. of shelving racks, peg boards, clothes hangers, or the like) support a variety of items for purchase by customers of the facility 104.

The facility 104 also includes a storage room 116 (e.g. for additional inventory to replenish the rows 108). At least some items in the facility 104 are associated with a location tag, such as an RFID tag. The RFID tag can be any type of RFID tag including, but not limited to, a passive Ultra High Frequency (UHF) RFID tag. A passive UHF RFID tag can be operable at short and high-energy wavelengths which can translate into a long-read range. As such, a passive UHF RFID tag can be detected and read by a variety of hardware (e.g., an RFID reader, an antenna, an RFID equipped robot, etc.) at distances including 16-20 feet for a standard sized passive UHF RFID tag and at a distance of 30 feet for a large sized passive UHF RFID tag. As described in further detail below, the system 100 provides for locating an item within a facility 104 by periodically detecting and reading an RFID tag affixed to the item.

The system 100 performs detection and location of an RFID tag by one or more location sensors. A location sensor can be installed in a facility 104 (e.g., mounted on ceilings, walls, poles, etc.) or deployed on a floor area 112 of a facility 104 to provide sufficient coverage of the facility 104. A location sensor can include, but is not limited to, an RFID reader (e.g., any combination of RFID antenna types and/or arrangements as part of each RFID reader), an RFID equipped robot (e.g., an AMR), and an RFID equipped unmanned aerial vehicle (UAV) such as a drone. It should be understood that an RFID equipped robot and UAV can include any combination of RFID antenna types and/or arrangements such that the RFID equipped robot and UAV can read an RFID tag.

Each location sensor can include one RFID antenna or multiple RFID antennas. Furthermore, each location sensor can include an RFID radio and antenna(s) integrated in the same enclosure, or the antenna(s) can be tethered via RF cable(s) remotely. In one embodiment, a location sensor can include multiple antennas circularly arranged to radiate outwardly from the circle. For example, the location sensor can include eight antennas evenly disposed at 45 degree intervals of a circle, with each antenna having a beam pattern extending in a different direction, and collectively generating a 360 degree coverage area for the location sensor. In another example, a location sensor can include three antennas arranged to collectively provide an 82 degree coverage area for the location sensor. In yet another example, a location sensor can include a phased-array antenna that is steerable (electronically and/or mechanically) to produce a beam pattern that extends in one or more pre-defined directions. It should be understood that a location sensor can provide varying read ranges based on one or more of a number of antennas, antenna arrangement and/or orientation, transmit power, environment, and RFID tag density. It should also be understood that other forms of location sensing technology can be employed instead of RFID.

The system 100 includes a plurality of location sensors 120-1, 120-2, 120-3, 120-4, and 120-5 (collectively referred to as the location sensors 120). The location sensors 120 can be ceiling-mounted location sensors with circular coverage areas. For example, the location sensors 120 can be mounted 15-25 feet above a floor area 112 of a facility 104. The number and placement of location sensors 120 can vary from facility to facility to provide sufficient coverage of the floor area 112. For example, the coverage of the location sensors 120 may overlap such that any point in the floor area 112 is within the coverage area (e.g., the area within which a corresponding location sensor 120 can detect tags) of at least two location sensors 120. The location sensors 120 can provide a read range of approximately 30 feet and can run continuously twenty-four hours a day for seven days a week.

The system 100 also includes a plurality of location sensors 122-1, 122-2, 122-3 and 122-4 (collectively referred to as the location sensors 122). The location sensors 122 can be AMRs that move autonomously about aisles 106 of the floor area 112 along predetermined paths 123-1, 123-2, 123-3 and 123-4 (collectively referred to as the predetermined paths 123). For example, the location sensor 122-1 can move up and down aisles 106 of a floor area 112 of a facility 104 along predetermined path 123-1. Additionally, the location sensors 122 can utilize one or more antennas to detect and read RFID tags. For example, the location sensors 122 can utilize three antennas generating an 82 degree coverage area for the location sensors 122 and a read range of approximately twenty-five feet based on one or more of an environment (e.g., facility type and features thereof), transmit power, tag placement, and RFID tag density. The location sensors 122 can perform continuous cycle counting and utilize reporting tools which provide for inventory counts and checks multiple times per day. Additionally, the location sensors 122 can run twenty-four hours a day for seven days a week. As described in further detail below, as the location sensors 122 move autonomously about the aisles 106 of the floor area 112, the three antennas thereof detect and read RFID tags affixed to items positioned on the rows 108 (e.g., of shelving racks) adjacent to the location sensors 122, map item location information, and transmit the item location information to a database of the system 100.

The system 100 also includes location sensors 124-1 and 124-2 (collectively referred to as location sensors 124) in a storage area 116. The location sensors 124 can be mounted to the infrastructure, such as the ceiling, of facility 104 and can have rectangular coverage areas. The system 100 also includes a transition location sensor 128 disposed at a doorway between the floor area 112 and the storage area 116. The transition location sensor can have two distinct coverage areas, one on each side of the doorway, to detect when an RFID tag transitions between the storage area 116 and the floor area 112 in either direction. It should be understood that the system 100 can include additional transition sensors disposed at other transition locations (e.g., other doorways between the floor area 112 and the storage room 116, facility entrances and/or exits, etc.). The number and placement of location sensors 124 and 128 can vary from facility to facility to provide sufficient coverage of each of the storage area(s) 116 and transition(s) in the facility 104.

It should be understood that any number and combination of types of location sensors can be deployed in a facility 104 for item location tracking, depending on a layout and features of a facility 104 as well as location tracking use case(s).

The system 100 also includes a computing device 132 (e.g., a server) in communication with the location sensors 120, 122, 124, and 128 and a mobile device 168 (e.g., a smartphone, tablet, or mobile computer) of a user 164 via a network 138 (e.g., a wired or wireless access point). For example, the computing device 132 can be in communication with the location sensors 120, 122, 124, and 128 and the mobile device 168 via communication links 136-1, 136-2 and 136-3 (for simplicity, communication links between the computing device 132 and location sensors 124 and 128 are not shown).

The computing device 132 includes a processor 140 (e.g., a controller) in communication with a memory 144 (e.g., a non-transitory computer readable storage medium). The memory 144 can include a combination of volatile memory (e.g., Random Access Memory (RAM)) and non-volatile memory (e.g., read only memory (ROM), Electrically Erasable Programmable Read Only Memory (EEPROM), flash memory, etc.). The processor 140 and the memory 144 each comprise one or more integrated circuits. The computing device 132 also includes a communications interface 148 such that the computing device 132 can exchange data with other devices, including the location sensors 120, 122, 124, and 128 and the mobile device 168 via the network 138.

The memory 144 stores computer readable instructions for execution by the processor 140. In particular, the memory 144 stores code 152 (e.g., a location application) which, when executed by the processor 140, configures the processor 140 to process sensor data received from the location sensors 120, 122, 124 and 128 of the system 100 to determine locations of RFID-tagged items within the facility 104. For example, the computing device 132 can receive from each location sensor, for each RFID tag detected by that location sensor, an identifier (e.g., an electronic product code (EPC)) of the RFID tag and a signal strength associated with a response from the RFID tag. The computing device 132 can determine locations of RFID tagged items based on previously stored location sensor positions within the facility, the sensor data, and, for at least some sensors, previously stored orientations of the location sensors within the facility. For location sensors having multiple antennas each with a different coverage area (e.g., the antennas point in different directions, have different gains and/or radiation patterns, are transmitting at different power levels, etc.), the sensor data may also include which of these antenna(s) detected the RFID tag. As mentioned above, a location sensor can include eight antennas circularly arranged, pointed outwards, and evenly disposed at 45 degree intervals. In this example, the sensor data can include for each RFID tag detected the antenna number label(s) (e.g., #1 through #8) of the antenna(s) that detected each RFID tag. The system 100 can utilize the orientation, and corresponding coverage area, of each of the eight antennas within the location sensor to determine the locations of detected RFID tags relative to the sensor.

The RFID tag locations may be transmitted to and stored in the memory 144 and/or transmitted to other computing devices such as the mobile device 168. For example, the system 100 can provide feedback, autonomously and in real-time, to a user 164 while locating an RFID-tagged item. As mentioned above, a user 164 can carry or otherwise access a mobile device 168 (e.g., a smartphone, tablet, or mobile computer). The feedback data can be displayed via an output assembly of the mobile device 168, such as a display 172. The feedback data can indicate which of the location sensors 120, 124, 128 has detected a location change of an RFID-tagged item and, in response to the detected location change, which of the location sensors 122 has been mobilized to detect a static position of the RFID-tagged item.

The code 152 could be programmed using any suitable programming languages including, but not limited to, C, C++, C #, Java, or any other suitable language. Additionally, the code 152 could be distributed across multiple computer systems in communication with each other over a communications network, stored within hardware, and/or stored and executed on a cloud computing platform and remotely accessed by a computer system in communication with the cloud platform. The code 152, executed by the processor 140, could communicate with a database 176, which could be stored on the same computer system as the code 152, or on one or more other computer systems in communication with the code 152.

As shown in FIG. 1, the computing device 132 stores in the memory 144, the database 176 containing location sensor attributes for use during the location process mentioned above. For example, the database 176 can store the expected position of each location sensor according to a frame of reference previously established in a facility 104. For location sensors with orientations, such as the sensors 120, 124, and 128, the database 176 can also contain expected orientations according to frames of reference previously established in both the facility 104, which could be notated with a compass rose on an associated layout, and the location sensors. For example, an orientation of 0 degrees could be defined as the alignment of a specified feature of a location sensor with the "up" direction on the layout depicted from overhead in FIG. 1 (e.g., this feature points to the top of the layout). An orientation of 180 degrees would conversely be when this specified feature points in the "down" direction, or to the bottom of the layout depicted from overhead in FIG. 1.

The database 176 also contains coverage area definitions for the location sensors 120, 122, 124, and 128. As will be apparent to those skilled in the art, each location sensor has an effective range that defines an area of coverage within which the sensor can detect RFID tags. The database 176 defines respective coverage areas 178-1, 178-2, 178-3, 178-4, and 178-5 (collectively referred to as the coverage areas 178) for the location sensors 120. Each coverage area 178 has a defined radius extending about the expected location of the sensor 120 itself. It should be understood that a location sensor 120, 124 and 128 can have a larger or smaller coverage area. For example, a larger coverage area 179 of the sensor 120-3 is shown in FIG. 1.

The database 176 also contains coverage area definitions for the location sensors 122. For example, the database 176 defines respective coverage areas (not shown) of the predetermined paths 123-1, 123-2, 123-3, and 123-4 for the location sensors 122. Additionally, each location sensor 122 has an effective range that defines an area of coverage (not shown) within which the location sensor 122 can detect RFID tags of items statically positioned on rows 108 (e.g., of shelving racks) adjacent to the location sensor 122 as it moves up and down aisles 106 along the predetermined paths 123. Each location sensor 122 coverage area can have a defined radius extending about the location of the location sensor 122 as it moves. Alternatively, each location sensor 122 can have directional coverage areas via respective antennas. As such, the location sensor 122 can provide a more accurate location estimation of a static item positioned on a row 108. For example, a location sensor 122 can include three antennas with a collective coverage area defined in one plane over an 82 degree arc (elevation). Furthermore, each of the three antennas can have a coverage area that is a subset of the collective 82 degree arc, and the system 100 can utilize the orientation, and corresponding coverage area, of each of the three antennas within the location sensor 122 to determine the locations of detected RFID tags relative to the sensor.

It should be understood that a location sensor 122 can have a larger or smaller coverage area depending on a variety of factors. For example, a location sensor 122 can include additional and/or different antennas resulting in a collective coverage area that extends beyond an 82 degree arc (elevation). As described in further detail below, the system 100 can modify the coverage area definitions for the location sensors 122 as RFID-tagged items are transported through a facility 104.

The database 176 also defines coverage areas 180-1 and 180-2 (collectively referred to as coverage areas 180) corresponding to the location sensors 124-1 and 124-2. The coverage areas 180 can be defined by widths and lengths of rectangular areas centered on the expected positions of the location sensors 124.

It should be understood that coverage areas are not limited to circular and rectangular shapes but can instead be defined as any appropriate shape. The relationship of a coverage area to an expected position of a location sensor can depend on the shape of the effective coverage of the sensor (e.g. directional versus omnidirectional) and/or the physical orientation of the sensor relative to a facility 104, which may include how and/or where the location sensor is mounted. For example, a location sensor can include a directional antenna that is mounted from a ceiling and pointed towards the floor area 112. This location sensor can have a resulting coverage area resembling a circle on a layout of the facility 104 that is centered on a position of the location sensor.

In another example, a location sensor can include the same type of directional antenna but instead can be mounted on a wall and pointed laterally into a facility 104. As such, the coverage area can be indicative of a rectangle on a layout of the facility 104 extending from the location sensor in the direction the antenna is pointing. In this example, a center of the rectangular coverage area is not aligned with a position of the location sensor. Instead, an edge of the coverage area is aligned with the position of the location sensor. It should also be understood that a coverage area of each sensor can be influenced by the environment local to the location sensor. For example, the sensor may be adjacent to a reflective or absorptive surface, which can affect performance characteristics of the location sensor and may therefore justify a limitation or expansion of the coverage area accordingly.

The database 176 also defines a coverage area 184 corresponding to the location sensor 128. The coverage area 184 can be defined by a width and a length of a rectangular area centered on the expected position of the sensor 128. The coverage area 184 can be defined as two sub-zones, on opposite sides of the expected position of the location sensor 128 and corresponding to the distinct coverage areas of the location sensor 128.

Those skilled in the art will appreciate that the functionality implemented by the processor 140 via the execution of the code 152 may also be implemented by one or more specially designed hardware and firmware components such as a field-programmable gate array ("FPGA"), application-specific integrated circuit ("ASIC"), embedded system, or other customized hardware components without departing from the spirit or scope of the present disclosure. It should be understood that FIG. 1 is only one potential configuration, and the system 100 of the present disclosure can be implemented using a number of different configurations.

Figure 2:
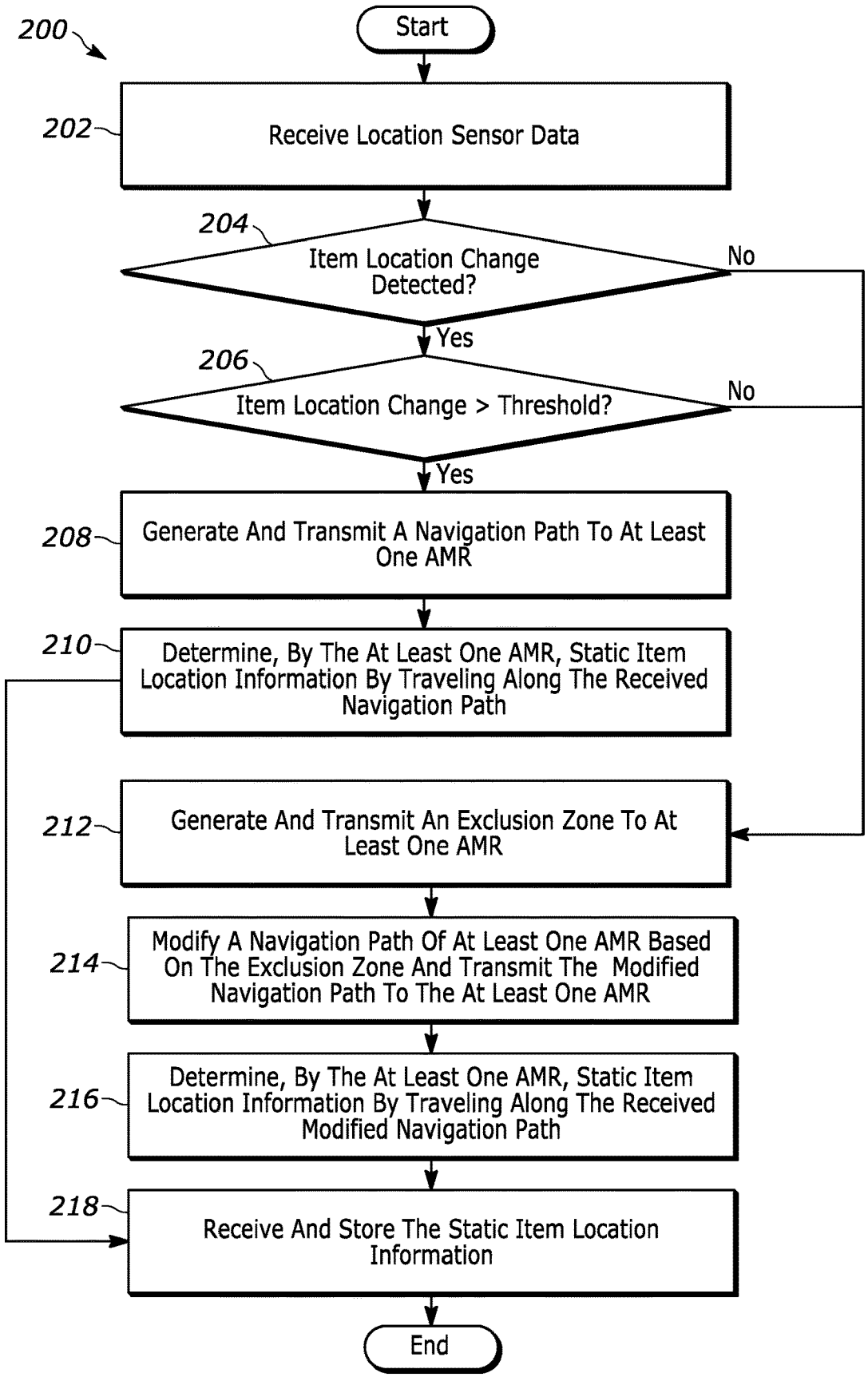
FIG. 2 is a flowchart illustrating processing steps carried out by the system of the present disclosure.

FIG. 2 is a flowchart illustrating processing steps carried out by the system of the present disclosure. Beginning in step 202, the system receives location sensor data. For example, the location sensors 120, 124 and/or 128 can receive location sensor data from reading RFID tags affixed to items in the facility 104. In step 204, the system detects whether an item has changed location based on the received location sensor data. If the system detects that an item has changed location, then the process proceeds to step 206. Alternatively, if the system does not detect that an item has changed location, then the process proceeds to step 212. In step 206, the system determines whether an item location change is greater than a threshold based on RFID tags read by the location sensors 120, 124 and/or 128. The threshold can include, but is not limited to, a predetermined number of RFID tags with a location change exceeding a specified distance, a percentage of RFID tags that have a location change exceeding a specified distance, a predetermined number of RFID tags read in a zone of the facility 104 that were not previously read in that zone (e.g., within a specified time period), and a percentage of RFID tags read in a zone of the facility 104 that were not previously read in that zone (e.g., within a specified time period).

If the system determines that an item location change is greater than the threshold, then the process proceeds to step 208. In step 208, the system generates and transmits a navigation path to at least one location sensor 122 (e.g., an AMR). In step 210, the system determines, by the at least one location sensor 122, static item location information by traveling along the received navigation path. Then the process proceeds to step 218 in which the system receives and stores the static item location information.

Alternatively, if the system detects an item has not changed location or determines that an item location change is less than the threshold, then the process proceeds to step 212. In step 212, the system generates and transmits an exclusion zone to at least one location sensor 122 (e.g., an AMR). In step 214, the system modifies a navigation path based on the generated exclusion zone and transmits the modified navigation path to the at least one location sensor 122. In step 216, the system determines, by the at least one location sensor 122, static item location information by traveling along the received modified navigation path. Then the process proceeds to step 218 in which the system receives and stores the static item location information.

Figure 3:
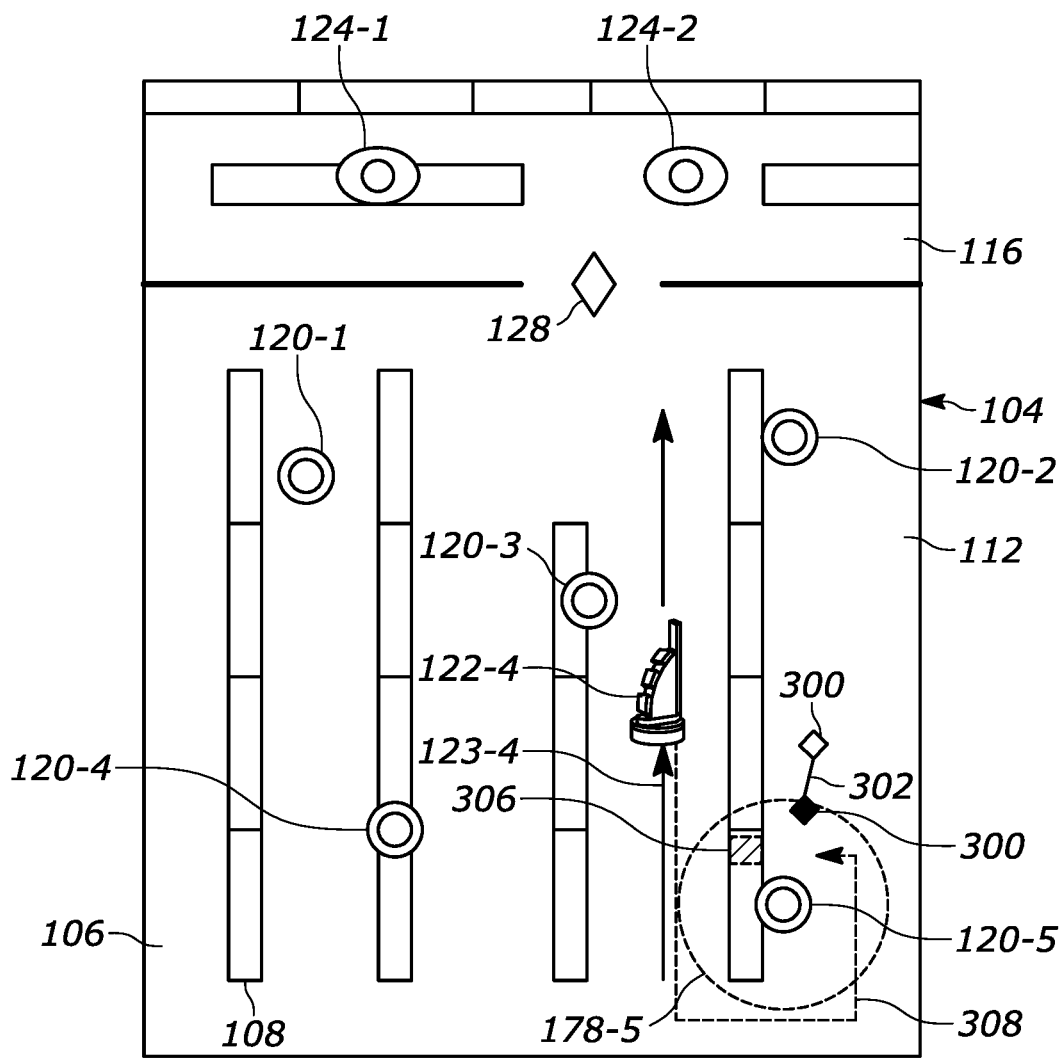
FIG. 3 is a diagram illustrating processing steps carried out by the system of the present disclosure for navigation path generation.

FIG. 3 is a diagram illustrating processing steps carried out by the system of the present disclosure for navigation path generation. As shown in FIG. 3, an item 300 having an RFID tag affixed thereto can be transported about the floor area 112 along a path 302 from a first position (not shaded) to a second position (shaded). The location sensor 120-5 can read the RFID tag affixed to the item 300 and the system can receive location sensor data from the location sensor 120-5 indicative of location information (e.g., coverage area 178-5 of the location sensor 120-5) of the item 300.

The system can detect a location change (e.g., from the first position to the second position) of the item 300 based on the received location sensor data. The system can also determine whether the location change (e.g., from the first position to the second position) of the item 300 is greater than a predetermined threshold. The threshold can include, but is not limited to, a location change for item 300 that exceeds a specified distance and a time between reads of item 300 by location sensor 120-5 that exceeds a specified duration (e.g. item 300 was not previously read in that zone within a specified time period). In addition, the threshold can be determined with item 300 being considered as part of a group of items contributing to a predetermined number of RFID tags with a location change exceeding a specified distance, a percentage of RFID tags that have a location change exceeding a specified distance, a predetermined number of RFID tags read in a zone of the facility 104 that were not previously read in that zone (e.g., within a specified time period), and a percentage of RFID tags read in a zone of the facility 104 that were not previously read in that zone (e.g., within a specified time period). As mentioned above, the location sensors 120 can be installed in an overhead position on a ceiling of the facility 104 such that their respective antennas have a fixed position and therefore have limited RF diversity (e.g., a line of sight) to locate an item statically positioned on a row 108. As such, the location sensor 120-5 can provide a general location estimation 306 of an item 300 statically positioned on the row 108.

As also shown in FIG. 3, the location sensor 122-4 moves autonomously about aisle 106 of the floor area 112 along the predetermined path 123-4. As mentioned above, each location sensor 122 has an effective range that defines an area of coverage (not shown) within which the location sensor 122 can detect RFID tags of items statically positioned on rows 108 (e.g., of shelving racks) adjacent to the location sensor 122 as it moves up and down aisles 106 along the predetermined paths 123. Each location sensor 122 can have directional coverage areas via respective antennas. For example, a location sensor 122 can include three antennas with a collective coverage area defined in one plane over an 82 degree arc (elevation). As such, the location sensor 122-4 can provide an improved location estimation of an item 300 statically positioned on the row 108. The system can generate and transmit a navigation path 308 to the location sensor 122-4 indicative of an area associated with the location information (e.g., coverage area 178-5) of the item 300 when the location change of the item 300 is greater than the predetermined threshold. This navigation path 308 may be a redirection of location sensor 122-4 from its previously determined path 123-4.

Figure 4:
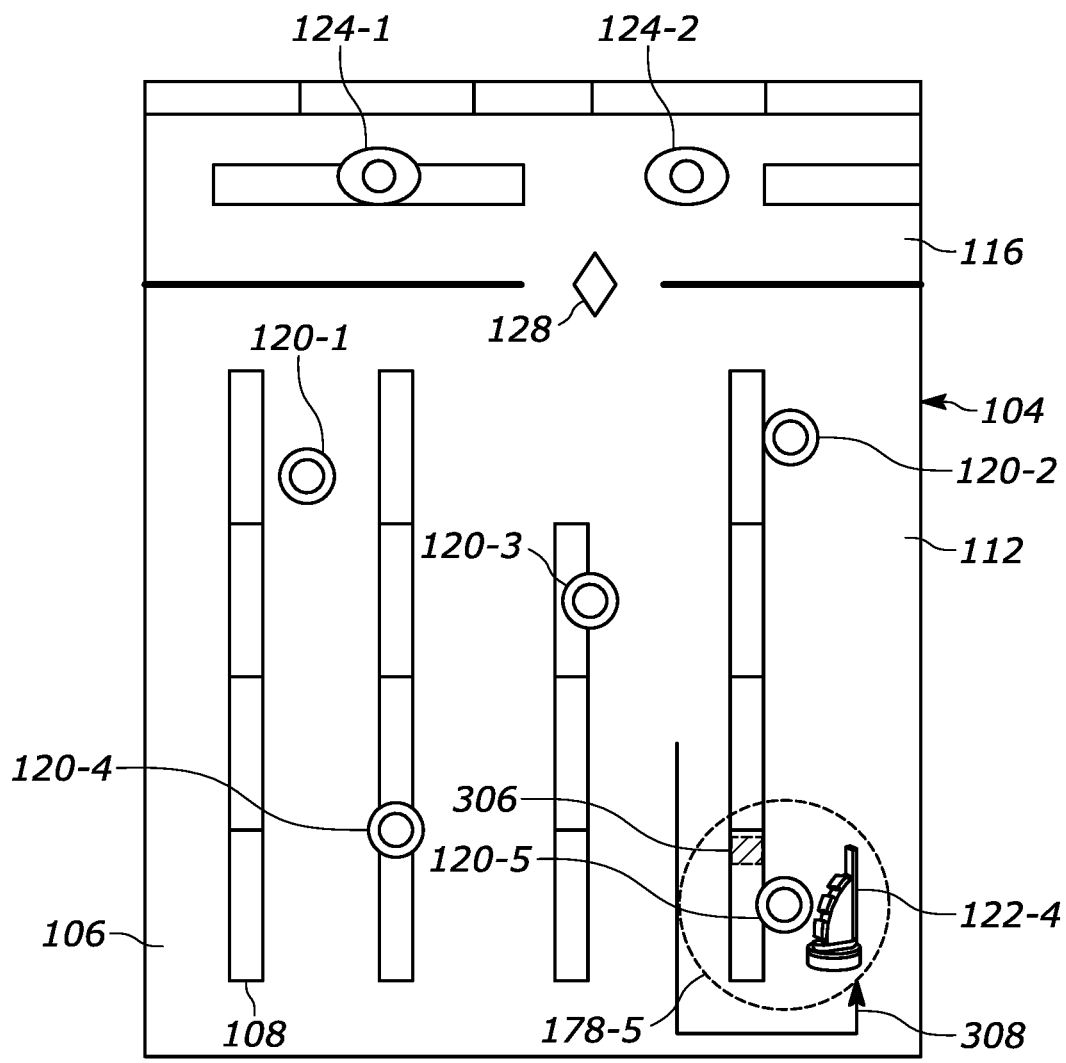
FIG. 4 is a diagram illustrating processing steps carried out by the system of the present disclosure for determining static item location information.

FIG. 4 is a diagram illustrating processing steps carried out by the system of the present disclosure for determining static item location information. As shown in FIG. 4, the location sensor 122-4 moves along the navigation path 308. As the location sensor 122-4 moves along the navigation path 308, the system can receive location sensor data from the location sensor 122-4 indicative of location information (e.g., a static position) of the item 300 positioned on the row 108 within the coverage area 178-5 of the location sensor 120-5.

Figure 5:
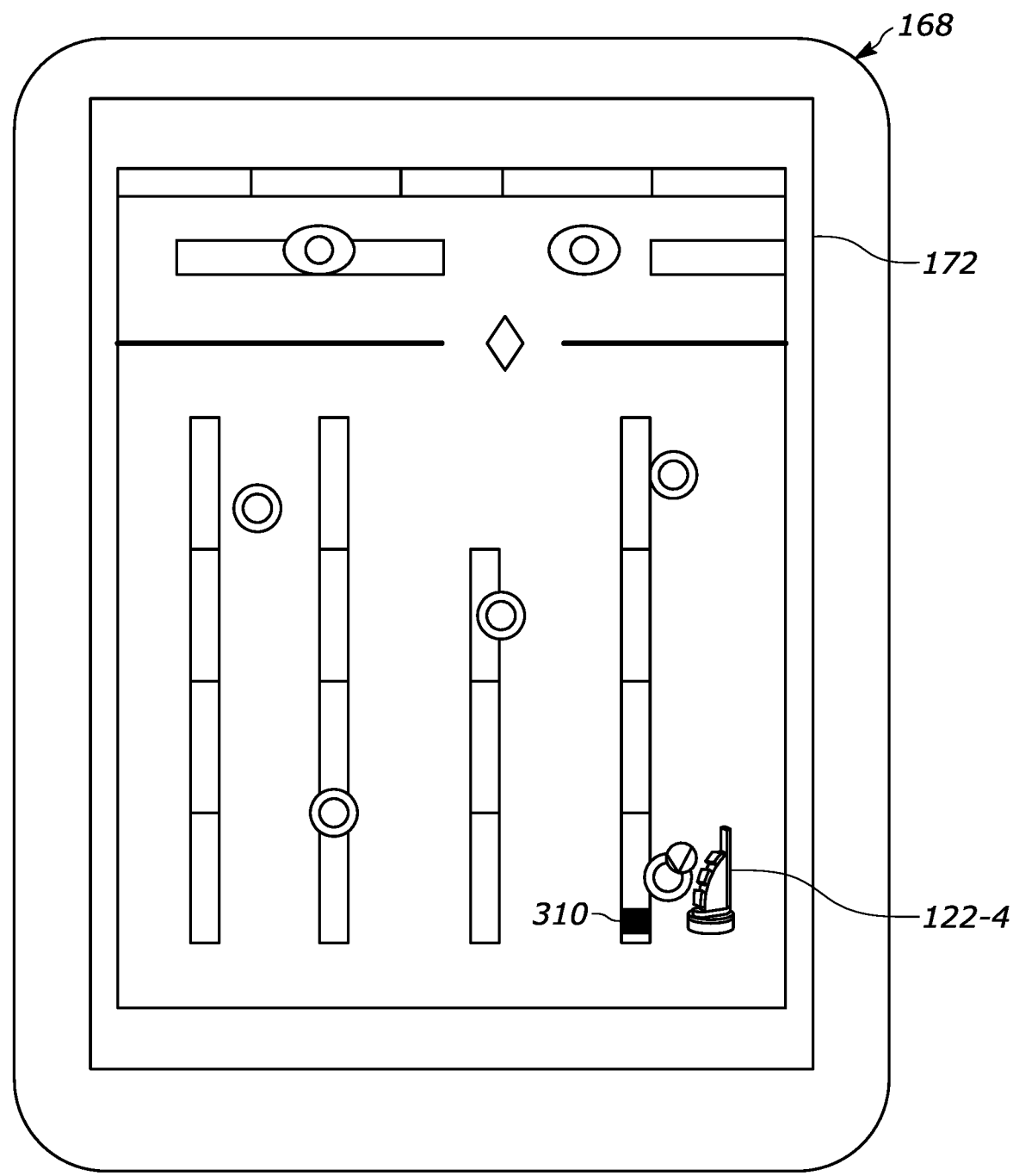
FIG. 5 is a screenshot illustrating item location confirmation based on navigation path generation.

FIG. 5 is a screenshot illustrating item location confirmation based on navigation path generation. In particular, FIG. 5 is a screenshot of a graphical user interface of a mobile device 168 of a user 164. As shown in FIG. 5, the system determines a static a position 310 of the item 300 based on the received location sensor data from the location sensor 122-4 indicative of location information (e.g., a static position) of the item 300 positioned on the row 108 within the coverage area 178-5 of the location sensor 120-5.

Figure 6:
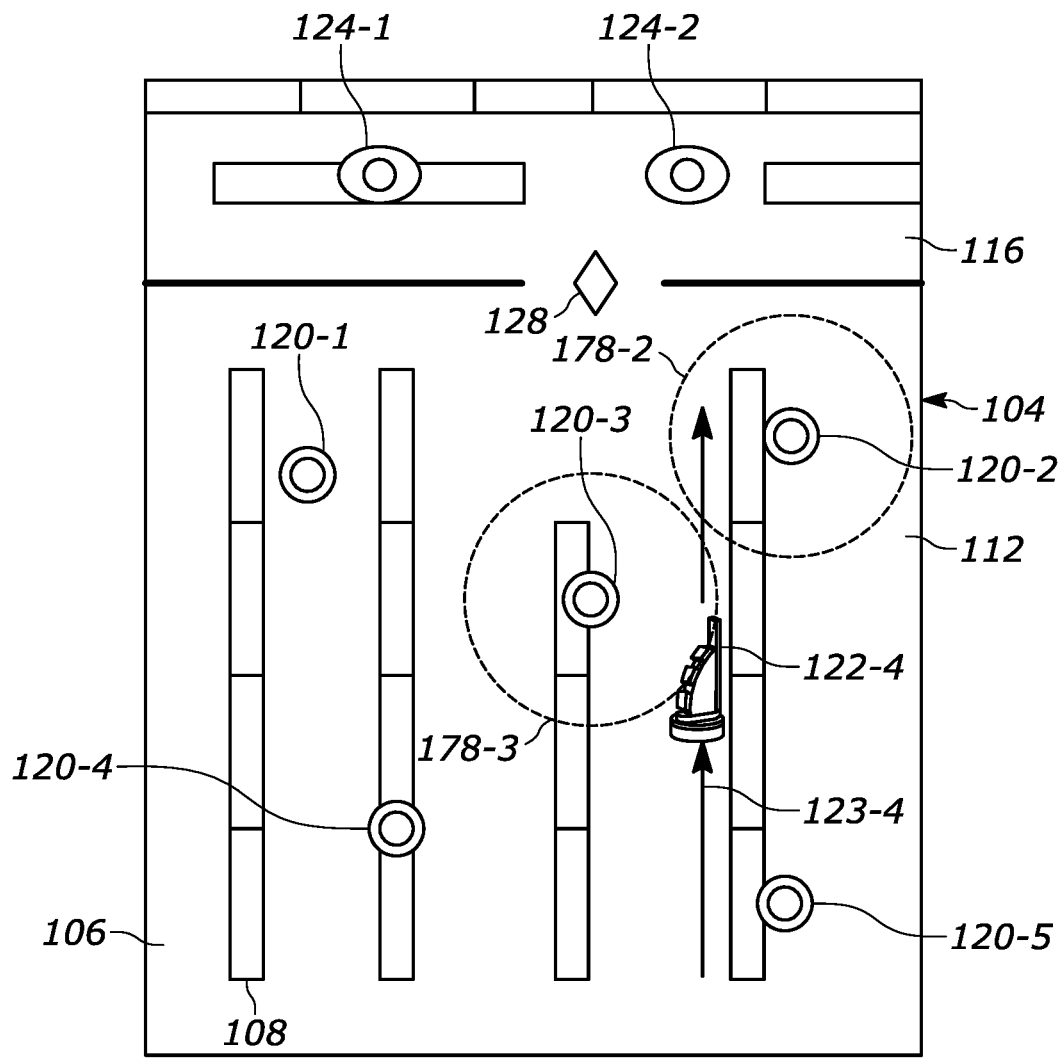
FIGS. 6-7 are diagrams illustrating processing steps carried out by the system of the present disclosure for exclusion zone generation.
Figure 7:
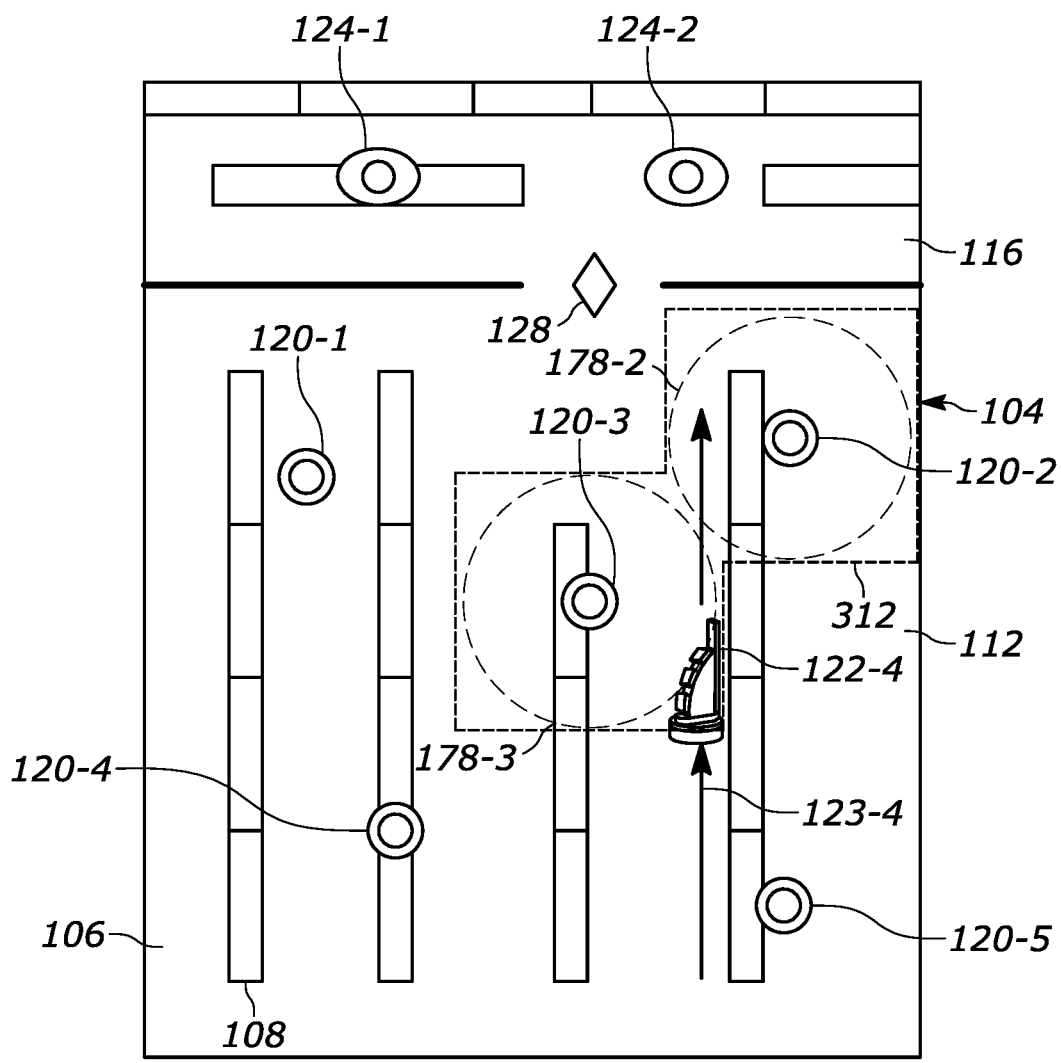

FIGS. 6-7 are diagrams illustrating processing steps carried out by the system of the present disclosure for exclusion zone generation. The location sensors 120-2 and 120-3 can read an RFID tag affixed to an item and the system can receive location sensor data from the location sensors 120-2 and 120-3 indicative of location information (e.g., respective coverage areas 178-2 and 178-3 of the location sensors 120-2 and 120-3) of an item. In addition, the location sensor 122-4 moves autonomously about aisle 106 of the floor area 112 along the predetermined path 123-4.

As shown in FIG. 6, an RFID tag affixed to an item is not present within the respective coverage areas 178-2 and 178-3 of the location sensors 120-2 and 120-3. Alternatively, within the coverage areas 178-2 and 178-3, there may not be enough items with RFID tags affixed to them whose physical locations have significantly changed (e.g., entered or exited coverage areas 178-2 and 178-3 or moved a significant distance within coverage areas 178-2 and 178-3), so the system does not detect a location change exceeding a predetermined threshold. As such, the system generates and transmits an exclusion zone 312 (as shown in FIG. 7) to the location sensor 122-4. The exclusion zone 312 is an area from which the location sensor 122-4 is excluded from traveling into when the system does not detect a location change of an item or when the detected location change of the item is less than a predetermined threshold. As mentioned above, the threshold can include, but is not limited to, a predetermined number of RFID tags with a location change exceeding a specified distance, a percentage of RFID tags that have a location change exceeding a specified distance, a predetermined number of RFID tags read in a zone of the facility 104 that were not previously read in that zone (e.g., within a specified time period), and a percentage of RFID tags read in a zone of the facility 104 that were not previously read in that zone (e.g., within a specified time period).

A location sensor 122 can spend an insufficient amount of time in areas (e.g., zones) of a facility 104 that are highly trafficked (e.g., subject to significant inventory changes) or can spend too much time in zones of a facility 104 that are lightly trafficked or static (e.g., infrequently subject to inventory changes). As described in further detail below, the exclusion zone 312 allows the location sensor 122-4 to efficiently utilize its time by avoiding zones of a facility 104 that have not been subject to significant inventory changes and instead spend more time scanning zones of the facility 104 that are more likely to have been subject to significant inventory changes.

Figure 8:
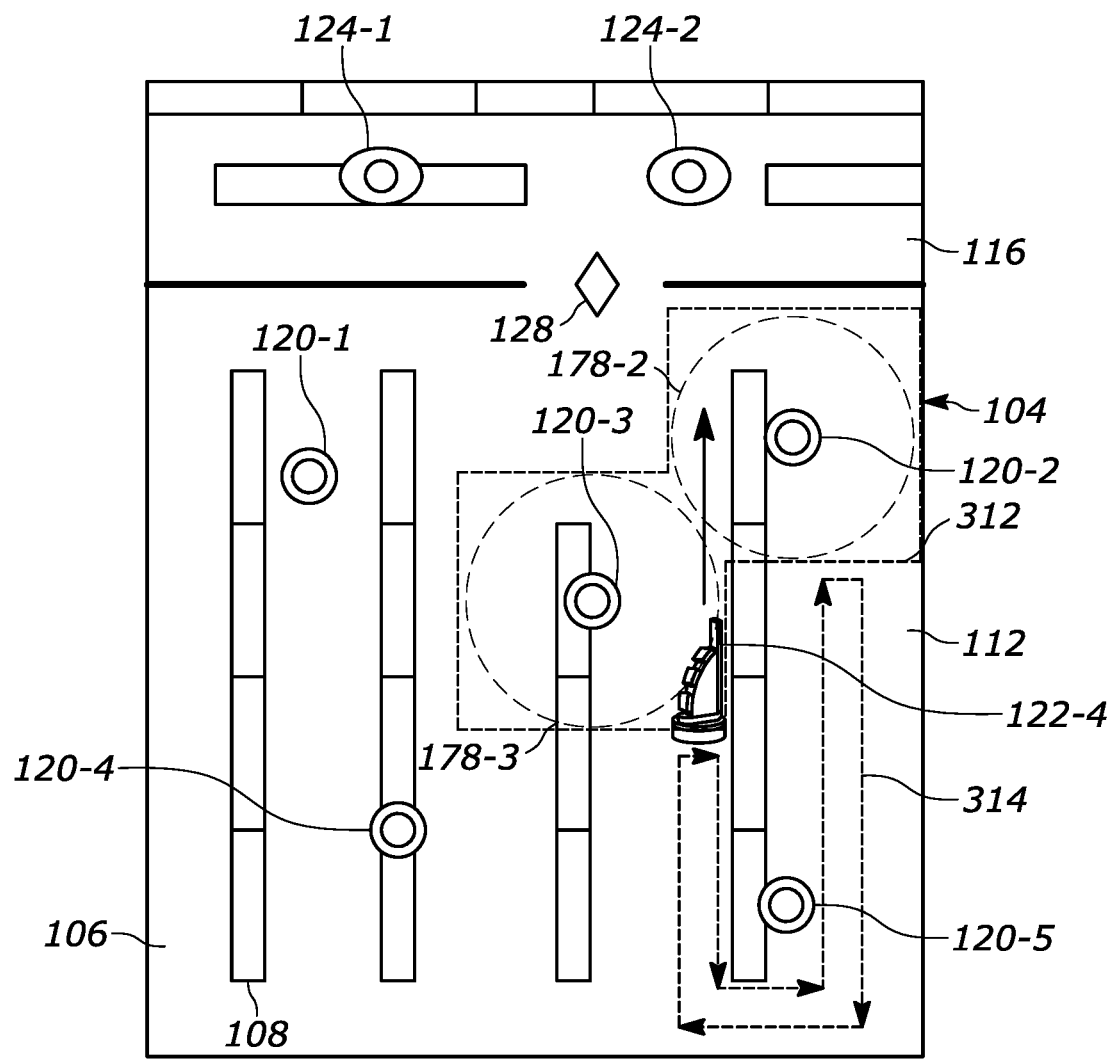
FIG. 8 is a diagram illustrating processing steps carried out by the system of the present disclosure for navigation path modification.

FIG. 8 is a diagram illustrating processing steps carried out by the system of the present disclosure for navigation path modification. The system can modify a navigation path of a location sensor 122 based on the exclusion zone 312 and transmit the modified navigation path to the location sensor 122. For example and as shown in FIG. 8, the system can modify the predetermined path 123-4 of the location sensor 122-4 to yield a navigation path 314.

Figure 9:
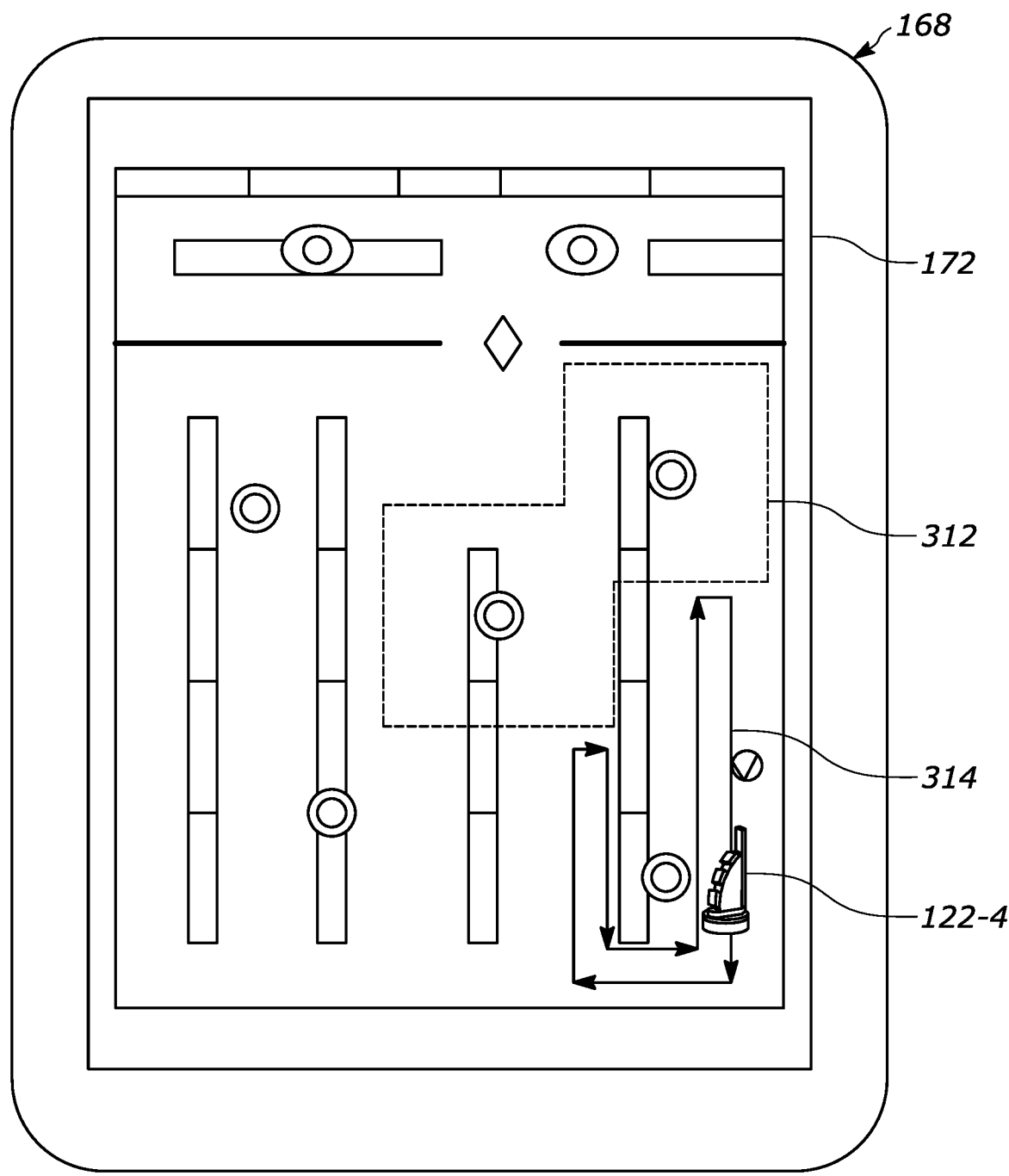
FIG. 9 is a screenshot illustrating navigation path modification confirmation based on exclusion zone generation.

FIG. 9 is a screenshot illustrating navigation path modification confirmation based on exclusion zone generation. In particular, FIG. 9 is a screenshot of a graphical user interface of a mobile device 168 of a user 164. As shown in FIG. 9, the system can confirm a modified navigation path 314 based on the exclusion zone 312. Additionally, the system can determine a static position of an item based on received location sensor data from the location sensor 122-4 as the location sensor 122-4 travels along the modified navigation path 314. The received location sensor data from the location sensor 122-4 is indicative of location information (e.g., a static position) of at least one item proximate to the modified navigation path 314.

As mentioned above, each location sensor 122 has an effective range that defines an area of coverage (not shown) within which the location sensor 122 can detect RFID tags of items statically positioned on rows 108 (e.g., of shelving racks) adjacent to the location sensor 122 as it moves up and down aisles 106 along the predetermined paths 123. Each location sensor 122 can have directional coverage areas via respective antennas. For example, a location sensor 122 can include three antennas with a collective coverage area defined in one plane over an 82 degree arc (elevation). As such, the location sensor 122-4 can provide an improved location estimation of an item statically positioned on the row 108.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed:

1. An automated and dynamic location tracking system comprising:
    a memory configured to store computer executable instructions; and
    a processor configured to interface with the memory and execute the computer executable instructions to cause the processor to:
        receive first location sensor data from a first location sensor indicative of first location information of at least one item associated with a radio frequency identification (RFID) tag,
        detect a location change of the at least one item based on the received first location sensor data,
        determine whether the location change of the at least one item is greater than a predetermined threshold,
        generate and transmit a navigation path to a second location sensor indicative of an area associated with the first location information when the location change of the at least one item is greater than a predetermined threshold, and
        receive second location sensor data from the second location sensor along the navigation path indicative of second location information of the at least one item within the area associated with the first location information.

2. The automated and dynamic location tracking system of claim 1, wherein
    the first location sensor is at least one of a ceiling mounted and wall mounted RFID reader, and
    the second location sensor is one of an autonomous mobile robot (AMR) having at least one RFID antenna.

3. The automated and dynamic location tracking system of claim 2, wherein
    the ceiling mounted RFID reader has eight RFID antennas that provide a collective coverage area of 360 degrees, and
    the AMR has three RFID antennas that provide a collective coverage area in one plane over an 82 degree elevation arc.

4. The automated and dynamic location tracking system of claim 1, wherein
    the predetermined threshold is one of a predetermined number of RFID tags with a location change exceeding a specified distance, a percentage of RFID tags that have a location change exceeding a specified distance, a number of RFID tags read in a zone that were not previously read in that zone within a specified time period, and a percentage of RFID tags read in a zone that were not previously read in that zone within a specified time period.

5. The automated and dynamic location tracking system of claim 1, wherein
    the second location information is indicative of a static position of the at least one item within the area associated with the first location information.

6. The automated and dynamic location tracking system of claim 1, wherein the processor
    generates and transmits an exclusion zone to the second location sensor indicative of an area from which the second location sensor is excluded when the location change of the at least one item is less than a predetermined threshold,
    modifies a navigation path of the second location sensor based on the exclusion zone and transmits the modified navigation path to the second location sensor, and
    receives third location sensor data from the second location sensor along the modified navigation path indicative of third location information of at least one item proximate to the modified navigation path.

7. The automated and dynamic location tracking system of claim 6, wherein
    the third location information is indicative of a static position of the at least one item proximate to the modified navigation path.

8. A method for automatic and dynamic location tracking, comprising:
    receiving first location sensor data from a first location sensor indicative of first location information of at least one item associated with a radio frequency identification (RFID) tag,
    detecting a location change of the at least one item based on the received first location sensor data,
    determining whether the location change of the at least one item is greater than a predetermined threshold,
    generating and transmitting a navigation path to a second location sensor indicative of an area associated with the first location information when the location change of the at least one item is greater than a predetermined threshold, and
    receiving second location sensor data from the second location sensor along the navigation path indicative of second location information of the at least one item within the area associated with the first location information.

9. The method of claim 8, wherein
the first location sensor is at least one of a ceiling mounted and wall mounted RFID reader, and
the second location sensor is one of an autonomous mobile robot (AMR) having at least one RFID antenna.

10. The method of claim 9, wherein
the ceiling mounted RFID reader has eight RFID antennas that provide a collective coverage area of 360 degrees, and
the AMR has three RFID antennas that provide a collective coverage area in one plane over an 82 degree elevation arc.

11. The method of claim 8, wherein
the predetermined threshold is one of a predetermined number of RFID tags with a location change exceeding a specified distance, a percentage of RFID tags that have a location change exceeding a specified distance, a number of RFID tags read in a zone that were not previously read in that zone within a specified time period, and a percentage of RFID tags read in a zone that were not previously read in that zone within a specified time period.

12. The method of claim 8, wherein
the second location information is indicative of a static position of the at least one item within the area associated with the first location information.

13. The method of claim 8, further comprising
generating and transmitting an exclusion zone to the second location sensor indicative of an area from which the second location sensor is excluded when the location change of the at least one item is less than a predetermined threshold,
modifying a navigation path of the second location sensor based on the exclusion zone and transmitting the modified navigation path to the second location sensor, and
receiving third location sensor data from the second location sensor along the modified navigation path indicative of third location information of at least one item proximate to the modified navigation path.

14. The method of claim 13, wherein
the third location information is indicative of a static position of the at least one item proximate to the modified navigation path.

15. A non-transitory computer readable medium having instructions stored thereon for automatic and dynamic location tracking which, when executed by a processor, causes the processor to carry out the steps of:
receiving first location sensor data from a first location sensor indicative of first location information of at least one item associated with a radio frequency identification (RFID) tag,
detecting a location change of the at least one item based on the received first location sensor data,
determining whether the location change of the at least one item is greater than a predetermined threshold,
generating and transmitting a navigation path to a second location sensor indicative of an area associated with the first location information when the location change of the at least one item is greater than a predetermined threshold, and
receiving second location sensor data from the second location sensor along the navigation path indicative of second location information of the at least one item within the area associated with the first location information.

16. The non-transitory computer readable medium of claim 15, wherein
the first location sensor is at least one of a ceiling mounted and wall mounted RFID reader, and
the second location sensor is one of an autonomous mobile robot (AMR) having at least one RFID antenna.

17. The non-transitory computer readable medium of claim 15, wherein
the predetermined threshold is one of a predetermined number of RFID tags with a location change exceeding a specified distance, a percentage of RFID tags that have a location change exceeding a specified distance, a number of RFID tags read in a zone that were not previously read in that zone within a specified time period, and a percentage of RFID tags read in a zone that were not previously read in that zone within a specified time period.

18. The non-transitory computer readable medium of claim 15, wherein
the second location information is indicative of a static position of the at least one item within the area associated with the first location information.

19. The non-transitory computer readable medium of claim 15, further comprising the steps of:
generating and transmitting an exclusion zone to the second location sensor indicative of an area from which the second location sensor is excluded when the location change of the at least one item is less than a predetermined threshold,
modifying a navigation path of the second location sensor based on the exclusion zone and transmitting the modified navigation path to the second location sensor, and
receiving third location sensor data from the second location sensor along the modified navigation path indicative of third location information of at least one item proximate to the modified navigation path.

20. The non-transitory computer readable medium of claim 19, wherein
the third location information is indicative of a static position of the at least one item proximate to the modified navigation path.

* * * * *